US009729702B2

(12) United States Patent
Seward et al.

(10) Patent No.: US 9,729,702 B2
(45) Date of Patent: Aug. 8, 2017

(54) CLIENT APPLICATION ENABLING MULTIPLE LINE CALL TERMINATION AND ORIGINATION

(71) Applicant: T-Mobile USA, Inc., Bellevue, WA (US)

(72) Inventors: Shelby Seward, Bellevue, WA (US); Robert F. Piscopo, Jr., Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/710,812

(22) Filed: May 13, 2015

(65) Prior Publication Data

US 2016/0337513 A1   Nov. 17, 2016

(51) Int. Cl.
*H04M 3/42* (2006.01)
*H04M 1/725* (2006.01)
(Continued)

(52) U.S. Cl.
CPC ..... *H04M 1/72583* (2013.01); *H04M 3/4228* (2013.01); *H04M 3/42348* (2013.01);
(Continued)

(58) Field of Classification Search
CPC ......... H04W 88/06; H04W 8/04; H04W 8/06; H04W 12/02; H04W 92/02; H04W 76/02;
(Continued)

(56) References Cited

U.S. PATENT DOCUMENTS 5,802,160 A   9/1998 Kugell et al.
8,315,613 B1  11/2012 Rahman et al.
(Continued)

FOREIGN PATENT DOCUMENTS

KR   1020050018723   2/2005
KR   1020060056051   5/2006
(Continued)

OTHER PUBLICATIONS

"Can I get Multiple Google Voice Numbers to one Phone?", retrieved Mar. 20, 2015 at http://www.quora.com/Can-I-get-multiple-Google-Voice-numbers-to-one-phone?share=1, 4 pgs.
(Continued)

*Primary Examiner* — Kwasi Karikari
(74) *Attorney, Agent, or Firm* — Lee & Hayes, PLLC

(57) ABSTRACT

In some implementations, a computing device may determine a location of the computing device. The computing device may have an associated first phone number. The computing device may determine that the location of the computing device is outside a geographic area in which a carrier associated with the first phone number provides service. The computing device may send a registration request to a local network indicating that the computing device is operating in an over the top mode. The computing device may originate an outgoing call from the computing device. The outgoing call appears to a called party to originate from a second phone number that is different from the first phone number.

18 Claims, 5 Drawing Sheets

(51) Int. Cl.
*H04M 7/12* (2006.01)
*H04W 64/00* (2009.01)
*H04W 8/06* (2009.01)

(52) U.S. Cl.
CPC ...... *H04M 7/1235* (2013.01); *H04M 2207/18* (2013.01); *H04M 2242/14* (2013.01); *H04W 8/06* (2013.01); *H04W 64/006* (2013.01)

(58) Field of Classification Search
CPC . H04W 88/02; H04W 8/205; H04W 28/0226; H04M 15/8038; H04M 2207/18; H04M 3/42195; H04M 15/8044; H04M 3/42297
See application file for complete search history.

(56) References Cited

U.S. PATENT DOCUMENTS

| | | | |
|---|---|---|---|
| 2003/0125072 A1 | 7/2003 | Dent | |
| 2004/0120552 A1 | 6/2004 | Borngraber et al. | |
| 2005/0075106 A1 | 4/2005 | Jiang | |
| 2006/0089140 A1* | 4/2006 | Zhang | H04W 8/26 455/432.1 |
| 2006/0094451 A1 | 5/2006 | Lee | |
| 2006/0105766 A1 | 5/2006 | Azada et al. | |
| 2006/0280169 A1 | 12/2006 | Mahdi | |
| 2007/0167158 A1 | 7/2007 | Ajjannavar et al. | |
| 2007/0206573 A1 | 9/2007 | Silver | |
| 2008/0043957 A1 | 2/2008 | Guo | |
| 2009/0061872 A1 | 3/2009 | Hicks | |
| 2010/0098057 A1 | 4/2010 | Stewart | |
| 2010/0291913 A1 | 11/2010 | Xu | |
| 2011/0061008 A1 | 3/2011 | Gupta et al. | |
| 2011/0163848 A1 | 7/2011 | Shibata | |
| 2011/0294472 A1* | 12/2011 | Bramwell | H04W 8/04 455/413 |
| 2012/0033610 A1 | 2/2012 | Ring et al. | |
| 2012/0099719 A1 | 4/2012 | Erb | |
| 2012/0290638 A1 | 11/2012 | Narula et al. | |
| 2013/0065567 A1 | 3/2013 | Cui et al. | |
| 2013/0157614 A1 | 6/2013 | Al-Zaben | |
| 2013/0288657 A1 | 10/2013 | Huang | |
| 2014/0052793 A1 | 2/2014 | John et al. | |
| 2015/0244862 A1 | 8/2015 | Salazar et al. | |
| 2016/0337825 A1 | 11/2016 | Piscopo, Jr. et al. | |
| 2017/0041460 A1 | 2/2017 | Seward et al. | |
| 2017/0078484 A1 | 3/2017 | Seward et al. | |

FOREIGN PATENT DOCUMENTS

| | | |
|---|---|---|
| KR | 1020070060616 | 6/2007 |
| KR | 1020070074291 | 7/2007 |
| KR | 1020100113664 | 10/2010 |
| KR | 1020120058203 | 6/2012 |
| KR | 1020130140332 | 12/2013 |
| WO | WO02089510 | 11/2002 |
| WO | WO2006085303 | 8/2006 |

OTHER PUBLICATIONS

Garcia-Martin et al, "Private Header (P-Header) Extensions to the Session Initiation Protocol (SIP) for the 3rd Generation Partnership Project (3GPP)", Jan. 2003, Network Working Group, RFC 3455, 34 pages.
Summerson, "Goggle Voice Now Lets You Have Multiple Numbers on One Account-for-a-Fee", Jun. 2011, retrieved Mar. 20, 2015 at www.androidpolice.com/2011/06/10/google-voice-now-lets-you-have-multiple-numbers-on-one-account-for-a-fee/, 4 pgs.
Office action for U.S. Appl. No. 14/710,861 mailed on Mar. 24, 2016, Piscopo Jr. et al., "Routing Multiple Numbers for One Telecommunications Device", 10 pages.
PCT Search Report and Written Opinion mailed Jul. 27, 2016 for PCT application No. PCT/US2016/031793, 11 pages.
PCT Search Report and Written Opinion mailed Aug. 3, 2016 for PCT application No. PCT/US2016/029188, 14 pages.
Office action for U.S. Appl. No. 14/854,492, mailed on Oct. 21, 2016, Seward et al., "Communication Termination Using Hunt Groups and Implicit Registration", 12 pages.
Office action for U.S. Appl. No. 14/710,861 mailed on Sep. 23, 2016, Piscopo Jr. et al., "Routing Multiple Numbers for One Telecommunications Device", 9 pages.
Office action for U.S. Appl. No. 14/710,861 mailed on Sep. 28, 2016, Piscopo Jr. et al., "Routing Multiple Numbers for One Telecommunications Device", 6 pages.
PCT Search Report and Written Opinion mailed Oct. 20, 2016 for PCT Application No. PCT/US16/42847, 10 pages.
PCT Search Report and Written Opinion mailed on Dec. 20, 2016 for PCT Application No. PCT/US16/50540, 13 pages.
Office action for U.S. Appl. No. 14/854,492 dated Mar. 30, 2017, Seward et al., "Communication Termination Using Hunt Groups and Implicit Registration", 15 pages.
Office action for U.S. Appl. No. 14/710,861 dated Mar. 8, 2017, Piscopo Jr. et al., "Routing Multiple Numbers for One Telecommunications Device", 7 pages.
Office action for U.S. Appl. No. 14/816,461, dated May 18, 2017, Seward, "Originating a Voice Call from a Selected Number Using a Temporary Routing Number", 7 pages.

* cited by examiner

CLIENT APPLICATION ENABLING MULTIPLE LINE CALL TERMINATION AND ORIGINATION

BACKGROUND

A computing device, such as a wireless phone, that is capable of terminating (e.g., receiving) or originating phone calls is typically associated with a particular phone number. The computing device can only terminate phone calls whose called number is the particular phone number. The computing device can only originate phone calls whose calling number is the particular phone number. Thus, someone with multiple businesses may have to carry multiple computing devices, because each of the computing devices is associated with a different phone number. Not only is this cumbersome for the user, but wasteful because the user has to acquire multiple computing devices, one computing device per phone number.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
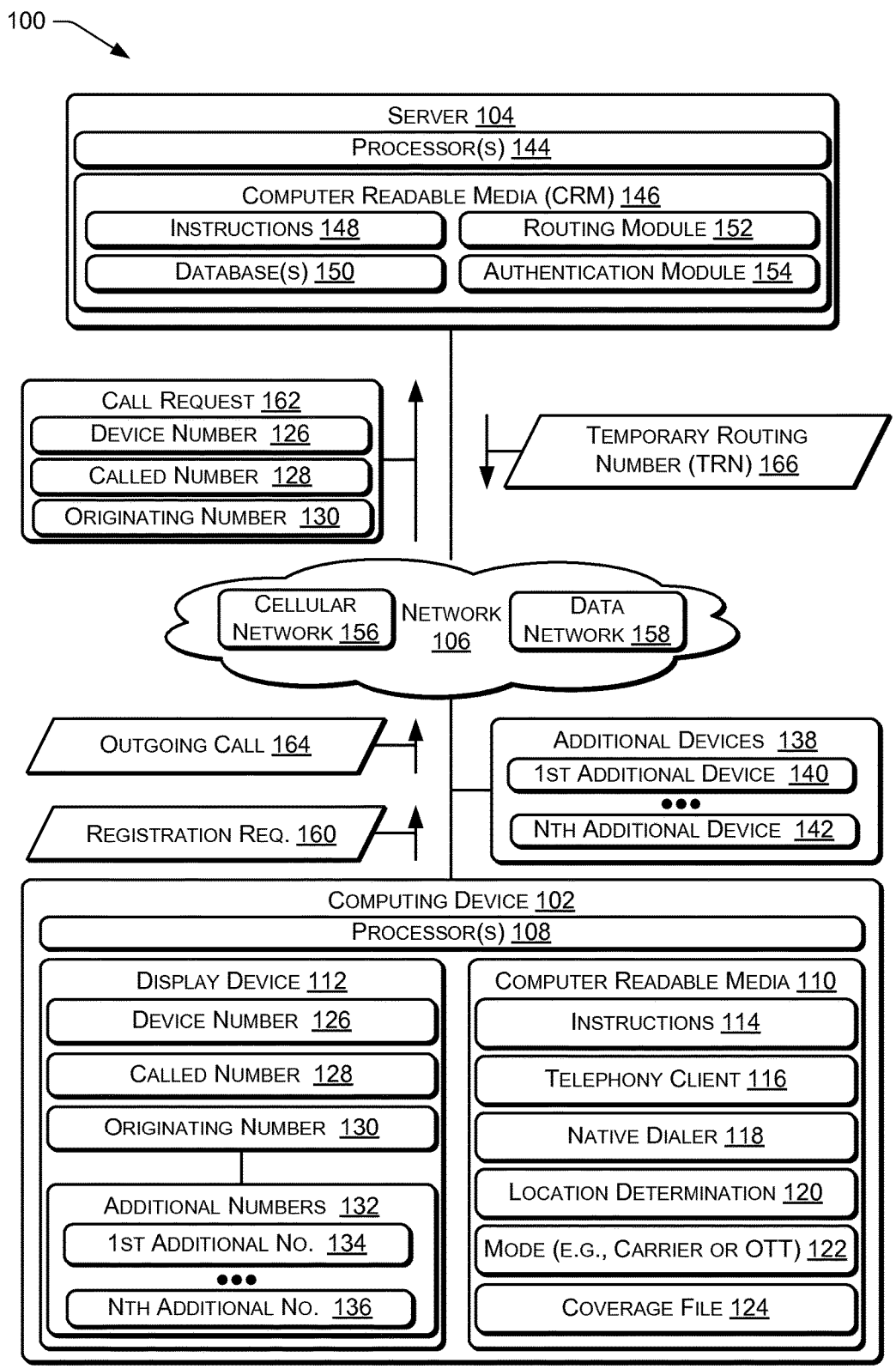
FIG. 1 is a block diagram illustrating a system that includes a telephony client enabling multiple line call origination according to some implementations.

The systems and techniques described herein enable devices to terminate (e.g., receive) and originate multiple calls for multiple lines, even in locations where the devices would normally be roaming. Moreover, the systems and techniques enable devices to terminate and originate multiple calls for multiple lines in a manner that is economical for the user, e.g., without incurring additional long distance charges when the devices would normally be roaming.

When a user acquires (e.g., purchases, leases, etc.) a computing device, such as a wireless phone, from a network provider (e.g., a carrier, such as T-Mobile®), the network provider may provide a telephony client software application that can be installed on multiple computing devices associated with the user. For example, the user may install the telephony client on the user's tablet computer and personal computer, thereby enabling the user to terminate calls and originate calls from additional devices, e.g., besides the user's wireless phone. The term "call" as used herein refers to a voice call, e.g., where the user desires to speak to another human being.

The user's wireless phone may be associated with a particular phone number. The telephony client may enable the user to enter additional phone numbers and, after determining that the user is authorized to use the additional phone numbers, the telephony client may enable the user to terminate calls that have the additional phone numbers as the called number and to originate calls that have the additional phone numbers as the calling number.

When the user is located in a location (e.g., geographic area) in which a carrier that is associated with the phone number of the user's wireless phone provides service, the client application may operate in a cellular mode. To originate a call that has one of the additional numbers as the calling number, the user may select (i) the called number and (ii) the desired originating number (e.g., one of the additional numbers) to be associated with the call. The client application may send a call request, via a data connection of the computing device, to the network. In response, the network may send the client application a temporary routing number (TRN). The client application may, in response to an instruction from a user, initiate an outgoing call to the TRN. The network may receive the outgoing call to the TRN and modify a call record (e.g., the call detail record (CDR) that includes the calling party address and the called party address) associated with the call by changing the originating number from the phone number associated with the user's wireless phone to the selected originating number and changing the called party number from the TRN to the intended recipient that was sent in the call request. The called party may view the call as being originated by the selected originating number even though the call was originated by a device in which the client application was installed. Thus, the user may originate an outgoing call from the computing device where the outgoing call appears to have originated from a different number than a phone number associated with the computing device (and different from the phone number associated with the user's wireless phone). The call detail record (CDR) is a data record produced by telecommunications equipment to document the details of a voice call or other communications transaction (e.g., text message) that passes through the telecommunications equipment. The CDR includes various attributes of the call, include a time that the call was initiated, a duration of the call, a completion status of the call (e.g., was the call completed), a source number, a destination number, and other data related to the voice call or the communications transaction.

In addition, when a second user calls one of the additional numbers, the client application may display an incoming call to the additional number and ask if the user desires to answer (e.g., terminate) the incoming call. The client application may enable the user to, in addition to answering the user's personal calls using the computing device, answer calls to a business associated with the user using the computing device. The client application may enable the user to answer calls to members of the user's family. For example, the user may answer, using the computing device on which the client application is installed, a call having a called number associated with the user's spouse or the user's child. Thus, the user may answer an incoming call using the computing device where the called number associated with the incoming call is different from the phone number associated with the computing device (and different from the phone number associated with the user's wireless phone).

When the user travels to a location, such as another country, where the user's wireless phone would normally roam (e.g., the carrier associated with the wireless phone does not provide network coverage in the location), the client application may continue to enable multiple line call termination and origination by switching from cellular mode to an over the top (OTT) mode. In some cases, the client application may automatically switch the user's computing device from cellular mode to OTT mode. In other cases, the client application may display a message indicating that additional charges may apply in cellular mode and that these charges may be reduced (or avoided) by switching to OTT mode.

In this way, a user may originate calls in a location where the user's wireless phone would normally roam and make the calls appear as if they were originating from a different phone number than the phone number associated with the user's wireless phone, without incurring long distance charges. In addition, the user may terminate calls in a location where the user's wireless phone would normally roam when the called number is different from the phone number associated with the user's wireless phone, without incurring long distance charges.

FIG. 1 is a block diagram illustrating a system 100 that includes a telephony client enabling multiple line call origination according to some implementations. The system 100 includes a computing device 102 coupled to a server 104 via a network 106.

The computing device 102 may be a wireless phone, a tablet computer, a laptop computer, a wristwatch, or other type of computing device. The computing device may include one or more processors 108 and computer readable media, such as memory (e.g., random access memory (RAM), solid state drives (SSDs), or the like), disk drives (e.g., platter-based hard drives), another type of computer-readable media, or any combination thereof.

The computer readable media 110 may be used to store instructions to perform various functions and to store data. For example, the computer readable media 110 may include instructions 114, a telephony client 116, a native dialer 118, a location determination module 120, a current mode 122 of operation, and a coverage file 124. Of course, the computer readable media 110 may also include other types of instructions and data, such as an operating system, device drivers, etc. The telephony client 116 may enable a user to enter a phone number associated with the user's wireless phone and subsequently use the computing device 102 to originate and terminate calls associated with the phone number. The telephony client 116 may enable a user to originate and terminate calls from other phone numbers in addition to the phone number associated with the user's wireless phone. The native dialer 118 (also known as a mobile dialer) is an application that enables calls to be originated via Voice over Internet Protocol (VoIP) using Session Initiation Protocol (SIP) signaling. The native dialer 118 may be a dialer application that the wireless phone uses to place calls that use cellular networks (e.g., using 2G/3G networks), calls that use voice over long term evolution (VoLTE) (e.g., using LTE/4G networks), or calls that use voice over WiFi® (VoWiFi). Which type of call (e.g., cellular call, VoLTE call, or VoWiFi call) the native dialer 118 selects may be based on the capabilities of the computing device 102 and the available network coverage at the time that the call is placed. The location determination module 120 may determine a current location of the computing device 102. For example, the location determination module 120 may determine the current location using the Global Positioning System (GPS). The current location as determined by the location determination module 120 may determine the mode 122. For example, if the current location of the computing device 102 is within a geographic area in which a carrier, associated with a device number 126 of the computing device 102, provides coverage, then the mode 122 may be set to cellular mode. If the current location of the computing device 102 is in a geographic area in which the carrier does not provide coverage (e.g., a location in which a wireless phone associated with the device number 126 would normally roam), then the mode 122 may be set to OTT mode.

The display device 112 may be separate from the computing device 102 or integrated (e.g., as illustrated in FIG. 1) with the computing device 102. The display device 112 may display various information associated with originating a call. For example, the display device 112 may display one or more of the device number 126, a called number 128, and an originating number 130 that is selected from one of additional numbers 132. The device number 126 may be an identifier associated with the user's wireless phone used to route incoming and outgoing call(s). For example, when the computing device 102 is the user's wireless phone, the device number 126 may be the phone number associated with the user's wireless phone. In addition to being used as a conventional 10 digit phone number, the device number 126 may also be used as a Uniform Resource Identifier (URI), e.g., as an Internet Protocol (IP) Multimedia Public Identity (IMPI), a unique permanently allocated global identity assigned by a home network operator (e.g., the carrier). In most cases, the IMPI comprises the international mobile subscriber identity (IMSI). The IMSI is used to identify the phone of a user of a cellular network and is a unique identification associated with all cellular networks. It is stored as a 64 bit field and is sent by the phone to the network. The IMSI may be provisioned in the subscriber identity module (SIM) card. The IMSI may be up to 15 digits in length. The first 3 digits may identify the mobile country code (MCC), the next set of digits (e.g., 2 digits for European networks or 3 digits for North American networks) may identify the mobile network code (MNC), and the remaining digits may include a mobile subscription identification number (MSIN) within the network's customer base. For example, the MSIN in North America may include a 10 digit number (e.g., 3 digit area code and 7 digital number). The called number 128 may be a destination number of a call that originates from the computing device 102. In other words, the called number 128 is the location to which the call is routed. The originating number 130 may be selected by a user. By default, the originating number 130 may be the device number 126. The user may override this default by selecting the originating number 130 from one of the additional numbers 132. For example, the additional numbers 132 may include a first number 134 through to an Nth additional number (N>0). The additional numbers 132 may include numbers associated with (i) family members of a user of the computing device 102, (ii) businesses (or other activities) associated with the user of the computing device 102, or both. The additional numbers 132 may be associated with additional devices 138. For example, the first additional number 134 may be associated with a first additional device 140 and the Nth additional number 136 may be associated with an Nth additional device 142.

The server 104 may include one or more processors 144 and one or more computer readable media 146. The computer readable media 146 may be used to store instructions 148, one or more databases 150, a routing module 152, and an authentication module 154. The instructions 148 may be executed by the processors 144 to perform the various functions described herein. The databases 150 may include a database storing information, such as which additional numbers are associated with a device number, etc. The routing module 152 may be used to setup and route calls from the computing device 102 in which the originating number 130 is different from the device number 126. The authentication module 154 may perform various types of authentication, including determining whether the user associated with the device number 126 is authorized to originate calls from the additional numbers 132.

The network 106 may include one or more networks, such as a cellular network 156 and a data network 158. The cellular network 156 may provide wide-area wireless coverage using a technology such as Global System for Mobile (GSM), Code Division Multiple Access (CDMA), Universal Mobile Telephone Service (UMTS) or the like. While communications between the cellular network 156 and computing devices (e.g., the computing device 102) may be performed using a wide-area wireless network, the cellular network 156 may include other technologies, such as wired (Plain Old Telephone Service (POTS) lines), optical (e.g., Synchronous Optical NETwork (SONET) technologies, and the like. The data network 158 may include various types of networks for transmitting and receiving data (e.g., data packets), including networks using technologies such as Institute of Electrical and Electronics Engineers (IEEE) 802.11 ("WiFi"), IEEE 8021.15.1 ("Bluetooth"), Asynchronous Transfer Mode (ATM), Internet Protocol (IP), and the like. The term "data network" refers to the data packets that are transmitted and received within the data network 158. The data packets may be used to carry voice traffic using VoIP or other technologies as well as data traffic.

In some situations, such as after being powered-on or at periodic intervals, the computing device 102 may use the location determination module 120 to determine a current location of the computing device 102 and set the mode 122 to either cellular mode (e.g., when the current location is in a service area of a carrier's cellular network associated with the device number 126) or OTT mode (e.g., when the current location is outside a service area of a carrier's cellular network associated with the device number 126). For example, when a user acquires a wireless phone (and corresponding phone number) from a United States (U.S.) carrier based in the United States, the computing device 102 may operate in cellular mode when the computing device 102 is located within the United States. When the user transports the computing device 102 to a different geographic location (e.g., Canada, France, or the like) where the U.S. carrier does not provide service, the computing device 102 may go into roaming in cellular mode and use a local carrier's cellular network. In such a situation, to originate calls or to terminate calls for multiple lines, the computing device 102 may be placed in OTT mode. For example, the computing device 102 may automatically switch from cellular mode to OTT mode after determining that the computing device 102 is roaming because the current location is outside the geographic area in which the U.S. carrier provides service. As another example, the computing device 102 may display a message to the user indicating that cellular mode in the current location would incur additional charges when terminating or originating calls from multiple lines and ask the user whether to switch from cellular mode to OTT mode.

The telephony client 116 may send a registration request 160 to register the computing device 102 with a local carrier's cellular network. For example, the telephony client 116 may send the registration request 160 to the server 104 to register the computing device 102 with the local carrier associated with the network 106. The registration request 160 may indicate whether the computing device is registering in cellular mode (e.g., to use the cellular network 156) or OTT mode (e.g., to use the data network 158). In cellular mode, the computing device 102 may originate calls and terminate calls using the cellular network. In OTT mode, the computing device 102 may originate calls and terminate calls using the data network 158 (e.g., via VoIP).

When a user desires to originate a call using the computing device 102, the telephony client 116 may prompt the user to select (or enter) the called number 128 (e.g., the destination of the call) and select the originating number 130. The originating number 130 may default to the device number 126 and the user may override the default selection by selecting one of the additional numbers 132. The computing device 102 may send, to the server 104, a call request 162 that includes the device number 126, the called number 128, and the originating number 130. The call request 162 informs the server 104 that a call will be placed from a device (e.g., the computing device 102) that is associated with the device number 128 to the called number 128 and requests that the server 104 modify call data associated with the call by using the originating number 130 as the caller identifier rather than the device number 128. For example, a call detail record associated with the call may be modified to include the originating number 130 as the caller identifier rather than the device number 128. The call data associated with a call may be used within the network to route a call (and for billing purposes). By using the originating number 130 as the caller identifier (e.g., instead of the device number 128) the call appears to the person being called as originating from the originating number 130 rather the device number 128. For example, a user may use the user's personal phone (e.g., computing device) to place a call that appears to originate from the user's business (or other activity in which the user engages) rather than the user's personal phone. The user is thus able to keep the user's personal phone number private (e.g., because the caller identifier displayed to the called party is the originating number 130) while still making use of the user's personal phone to place calls for the user's business (or other activity). As another example, a spouse may use the user's computing device (e.g., phone) to place a call that appears to originate from the spouse's computing device rather than the user's computing device. For example, if the spouse's computing device is inoperable (e.g., dead battery etc.) or unavailable (e.g., spouse left it behind), the spouse can place calls using the user's computing device while the calls appear to originate from the spouse's computing device. In this way, family members can place calls from a single computing device while making the calls appear as if they were originating from the family member's computing device.

After receiving the call request 162, the authentication module 154 may authenticate the call request 162 and determine whether the account associated with the device number is authorized to originate calls from the originating number 130. For example, the authentication module 154 may retrieve account information from the database(s) 150 to determine if the account associated with the device number 126 is authorized to originate calls from the originating number 130. When the account associated with the device number 126 is not authorized to originate calls from the originating number 130, the server 104 may send a message to the computing device 102 denying the call request 162. When the account associated with the device number 126 is authorized to originate calls from the originating number 130, the server 104 may create and send a temporary routing number (TRN) 166 to the computing device 102. In some cases, the routing module 152 may store at least a portion of the data associated with the call request 162 and the TRN 166 in the databases 150.

The computing device 102 may receive the TRN 166 and initiate the outgoing call 164. The outgoing call 164 may be made using the cellular network 156 when the computing device 102 is in cellular mode. The outgoing call 164 may be made using the data network 158 when the computing device 102 is in OTT mode. The TRN 166 is part of the signaling between the computing device 102 and the network 106 and may be sent via the data network 158. When the network 106 receives the outgoing call 164 with the TRN 166, the network 106 determines that special routing is to be used (e.g., because of the TRN), and routes the outgoing call 164 along with the TRN 166 to the routing module 152. In some cases, the routing module 152 may retrieve the data associated with the call request 162 and the TRN 166 from the databases 150. The routing module 152 may change the call data (e.g., CDR or other call data) associated with the outgoing call 164 such that the outgoing call 164 appears to be originating from the originating number 130 rather than the device number 126. For example, the call data may identify the device number 126 as the number from which the outgoing call 164 is being placed. The routing module 152 may change the call data associated with the outgoing call 164 by substituting the originating number 130 for the device number 126 in the call data, making the outgoing call 164 appear to have been placed from a device associated with the originating number 130.

For billing purposes, either the device number 126 or the originating number may be billed for the outgoing call 164, depending on the carrier's policy, the user's account preferences, or both. For example, some carriers may charge the device number 126 and disregard the originating number 130, while other carriers may charge the originating number 130 and disregard the device number 126. As another example, some carriers may enable the user to select whether the device number 126 or the originating number is billed for the outgoing call 164.

Thus, by using OTT mode, a user may originate calls in a location where the user's wireless phone would normally roam and make the calls appear as if they were originating from a different phone number than the phone number associated with the user's wireless phone, without incurring voice long distance charges (e.g., data roaming charges may still apply, unless the call is placed over a WiFi data connection). Long distance charges may not be incurred because the call (e.g., the outgoing call 164), the associated signaling (e.g., the call request 162 and the TRN 166), or both may be performed using the data network 158 portion of the network 106.

Figure 2:
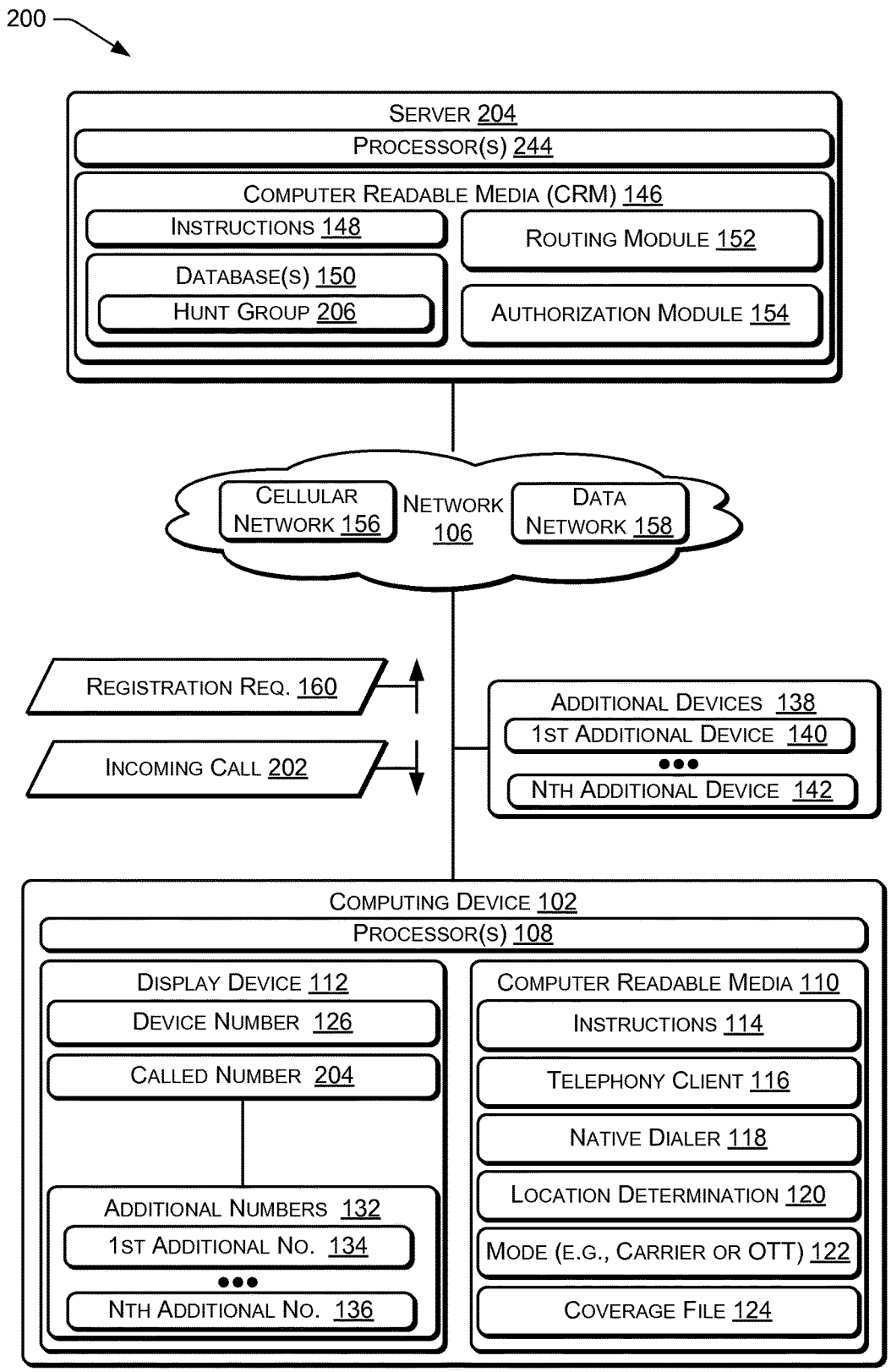
FIG. 2 is a block diagram illustrating a system that includes a telephony client enabling multiple line call termination according to some implementations.

FIG. 2 is a block diagram illustrating a system 200 that includes a telephony client enabling multiple line call termination according to some implementations.

The computing device 102 may use the location determination module 120 to determine a current location of the computing device 102 and set the mode 122 to either cellular mode (e.g., when the current location is in a service area of a carrier associated with the device number 126) or OTT mode (e.g., when the current location is outside a service area of a carrier associated with the device number 126). The telephony client 116 may send the registration request 160 to register the computing device 102 with a local carrier's network. For example, the telephony client 116 may send the registration request 160 to the server 104 to register the computing device 102 with the local carrier associated with the network 106. The registration request 160 may indicate whether the computing device is registering in cellular mode (e.g., to use the cellular network 156) or OTT mode (e.g., to use the data network 158). In some cases, the computing device 102 (e.g., phone) may be in cellular mode even though the call and signaling use a data network, such as, for example, when the computing device 102 supports VoLTE, VoWiFi, or both is communicating with the network via either LTE or WiFi. In cellular mode, the computing device 102 may originate calls and terminate calls using the cellular network. In OTT mode, the computing device 102 may originate calls and terminate calls using the data network 158 (e.g., via VoIP).

When a call, such as an incoming call 202, is received by the network 106 for routing to a particular computing device (e.g., the computing device 102), the network 106 determines a called number 204 (e.g., destination) associated with the call. The network 106 determines if the called number 204 is part of a hunt group. A hunt group is a group of two or more phone numbers to which phone calls originating from a single telephone number may be distributed. For example, in one type of hunt group, a call is routed to a first number in the hunt group 206. If the first number is busy or the call goes unanswered by the first number, then the call is routed to a second number and so on, until the call is answered (if all numbers in the hunt group have been tried and the call remains unanswered, the call may be routed to a voice mail box or the call may be routed back to the first number). In another type of hunt group (e.g., simultaneous hunt group), the call may be routed to the multiple numbers belonging to the hunt group 206 substantially contemporaneously (e.g., simultaneously), e.g., causing the multiple numbers in the hunt group 206 to indicate (e.g., using a ring tone) that the incoming call 202 is being received. When one of the numbers in the hunt group 206 answers the incoming call 202, the remaining numbers in the hunt group 206 no longer receive the incoming call 202, e.g., the remaining numbers no long indicate that the incoming call 202 is being received. In some implementations, the hunt group 206 may be a simultaneous hunt group.

The hunt group 206 may be created when a user with a device having a number acquires one or more additional devices with corresponding additional phone numbers and requests that the carrier associate two or more numbers to create a hunt group. For example, the user may initially acquire the computing device 102 that has the associated device number 126. The user may subsequently acquire the additional devices 138 and request that the carrier create the hunt group 206 and include the device number 126 and the additional numbers 132 (e.g., associated with the additional devices 138) in the hunt group 206.

When the incoming call 202 is received by the computing device 102 from the network 106, the network 106 may determine that the called number 204 of the incoming call 202 has the hunt group 206. The network 106 may simultaneously route the incoming call 202 to the numbers in the hunt group 206, e.g., to the computing device 102 and to the additional devices 138. The computing device 102 and the additional devices 138 may each display the called number 204 on their corresponding display devices to enable a user of each device to determine whether or not to terminate (e.g., answer) the incoming call 202.

The called number 204 of the incoming call 202 may be (i) the device number 126 when the incoming call 202 is being placed to the user associated with the computing device 102 or (ii) one of the additional numbers 132 when the incoming call 202 is not being placed to the user associated with the computing device 102. For example, the called number 204 of the incoming call 202 may be one of the additional numbers 132 when the called number 204 is associated with a family member of a user associated with the computing device 102 or a business (or other activity) associated with the user.

Based on viewing the called number 204, one of the users of the computing device 102 and the additional devices 138 may provide an instruction to terminate (e.g., answer) the incoming call 202. The remaining devices may then no longer indicate that the incoming call 202 has been routed to the devices. For example, the user of the computing device 102 may choose to terminate the incoming call 202. The additional devices 138 may no longer indicate the presence of the incoming call 202.

Thus, the computing device 102 may be used to terminate (e.g., answer) the incoming call 202 even when the called number 204 of the incoming call 202 is different from the device number 126 associated with the computing device 102.

The computer readable media 110 and 146 are examples of non-transitory computer-readable storage media, including (but not limited to) Random Access Memory (RAM), Read Only memory (ROM), Electrically Erasable Programmable Read-Only Memory EEPROM, flash memory or other memory technology, compact disc ROM (CD-ROM), digital versatile disks (DVD) or other optical storage, magnetic cassettes, magnetic tape, magnetic disk storage or other magnetic storage devices, or any other non-transitory medium which can be used to store the desired information and which can be accessed by the processors 108 and 244, respectively. Tangible computer-readable media can include volatile and nonvolatile, removable and non-removable media implemented in any method or technology for storage of information, such as computer readable instructions, data structures, program modules, or other data.

Figure 3:
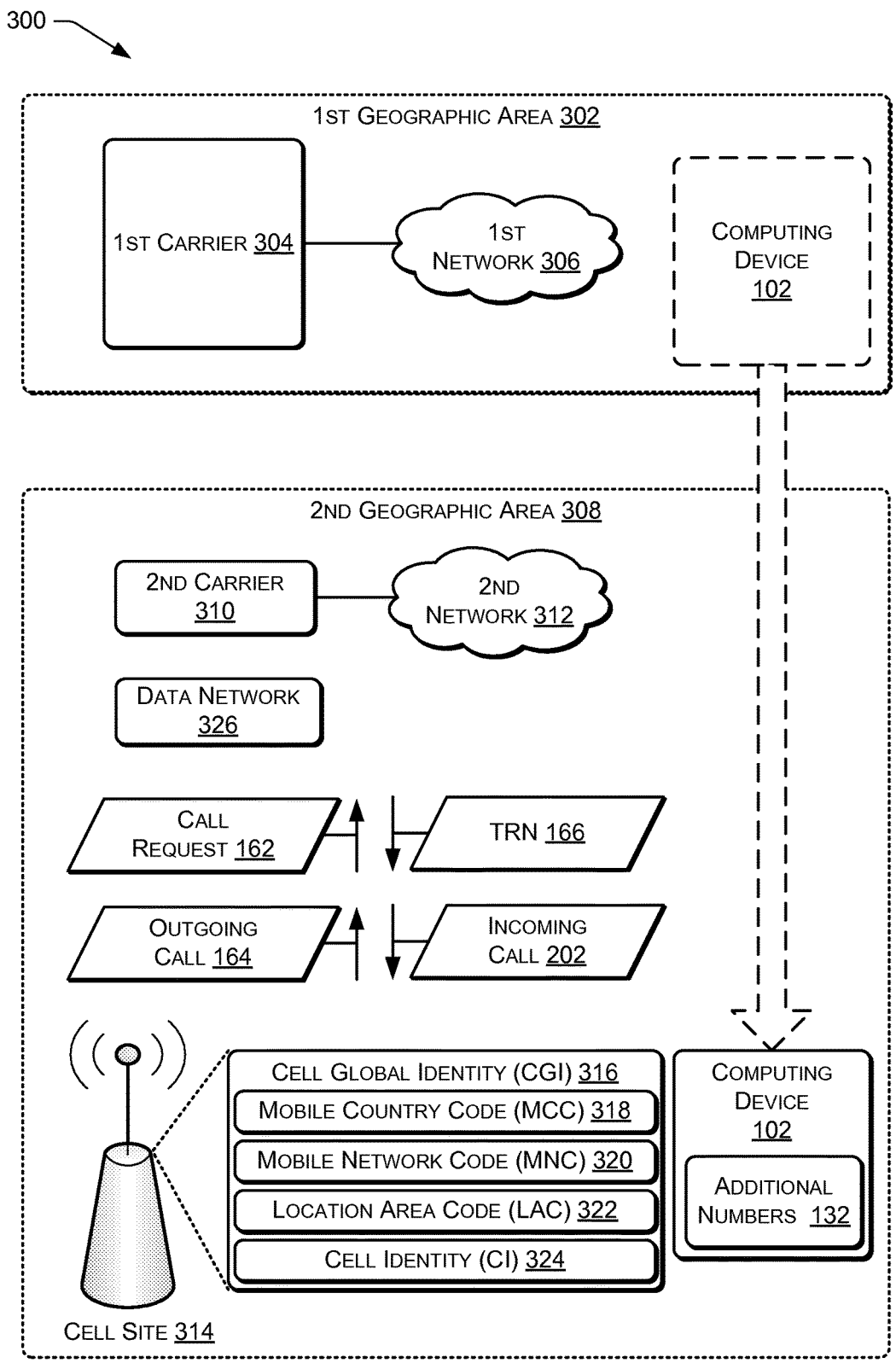
FIG. 3 is a block diagram illustrating a system that includes moving a telephony client enabling multiple line call origination and termination to a new location according to some implementations.

FIG. 3 is a block diagram illustrating a system 300 that includes moving a telephony client enabling multiple line call origination and termination to a new location according to some implementations. The system 300 illustrates what happens when a computing device is moved to a location where a carrier that is associated with the computing device does not provide network coverage.

In a first geographic area 302 (e.g., the United States), a first carrier 304 may use a first network 306 to provide coverage (e.g., wide area network wireless coverage) to the computing device 102. When the computing device 102 is within the first geographic area 302, the computing device 102 may operate in cellular mode.

When the computing device 102 is moved from the first geographic area 302 to the second geographic area 308 (e.g., France, Canada, or the like), the computing device 102, in cellular mode, may roam with the second network 312 of the second carrier 310. In cellular mode, originating a call from one of the additional numbers 132 would cause a first long distance call to be placed from the computing device 102 in the second geographic area 308 to the first network 306 in the first geographic area 302 and then a second long distance call from the first network 306 in the first geographic area 302 to a second computing device in the second geographic area 308. Thus, in cellular mode, originating a call from one of the additional numbers 132 may incur the costs for two long distance calls. To reduce the costs, the computing device 102 may be placed in OTT mode when a current location of the computing device 102 is not within the first geographic area 302.

The computing device 102 may determine a current location of the computing device 102 using a number of different techniques. For example, the computing device 102 may determine a current location of the computing device 102 using GPS (e.g., using a GPS receiver built-in to the computing device 102). As another example, the computing device 102 may determine a current location of the computing device 102 using information from a local cell site 314. Each cell site broadcasts a cell global identity (CGI) 316. The CGI 316 including several fields, including a mobile country code (MCC) 318, a mobile network code (MNC) 320, a location area code (LAC) 322, and a cell identity (CI) 324. The computing device 102 may determine a current location of the computing device 102 based on the MCC 318, the MNC 320, the LAC 322, or any combination thereof. For example, the computing device 102 may determine that a current location is a particular country based on the MCC 318. To illustrate, when the MCC=288, the computing device 102 may determine that the current location is France, when the MCC=302, the computing device 102 may determine that the current location is Canada, and so on.

After determining the current location of the computing device 102 and after determining that the current location is different from the first geographic area 302 in which the first carrier 304 provides service, in some cases, the computing device 102 may automatically (e.g., without human interaction) switch from cellular mode to OTT mode. In OTT mode, the call request 162 is sent and the TRN 166 received using a data network 326. For example, the data network 326 may be a portion of the second network 312 or may be different from the second network 312. In OTT mode, the outgoing call 164 is made using VoIP via the data network. The outgoing call 164 may be originated by the computing device 102 while appearing to originate from one of the additional numbers 132. In OTT mode, the outgoing call 164 is made using VoIP via the data network 326. The incoming call 202 may be received by the computing device 102 when the called number (e.g., destination number) of the incoming call 202 is one of the additional numbers 132. The incoming call 202 may be provided to the computing device 102 as a VoIP call over the data network 326.

Figure 4:
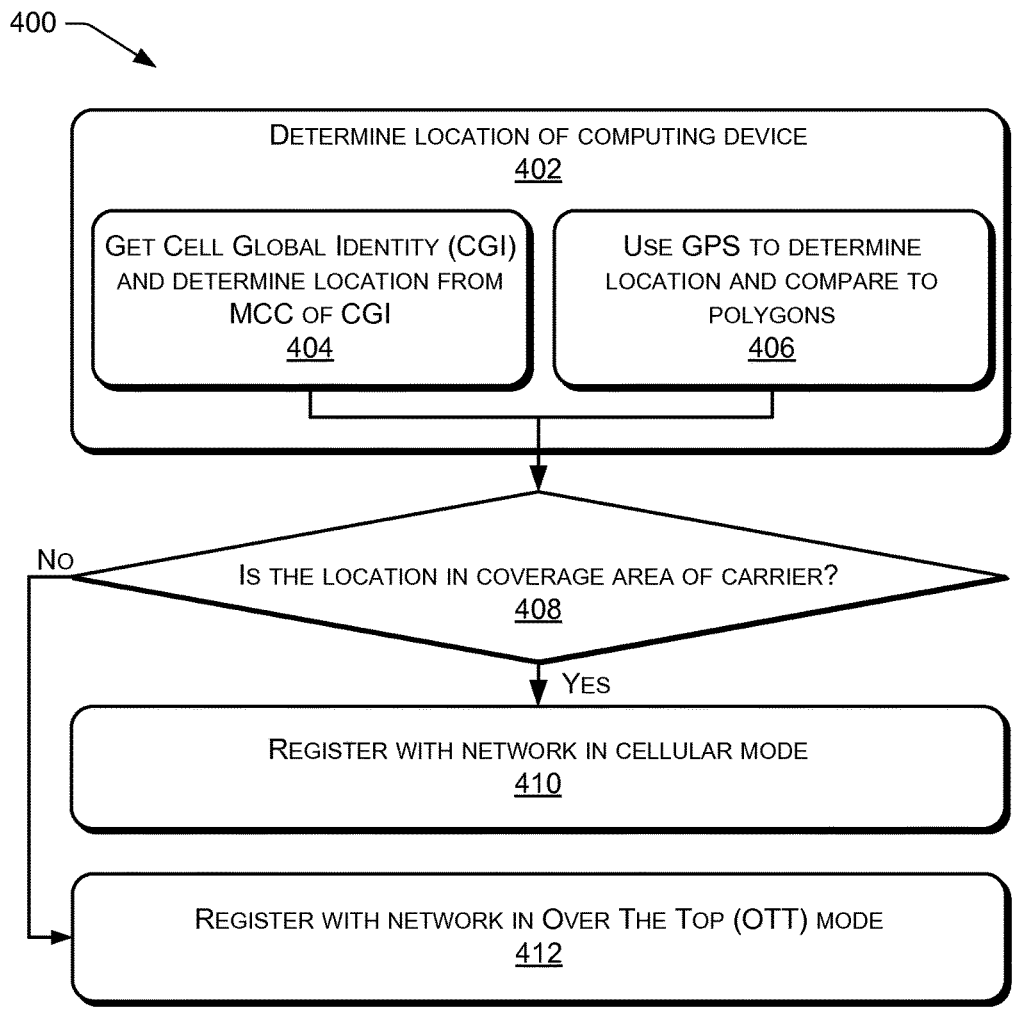
FIG. 4 is a flow diagram of an example process that includes determining a location of a computing device according to some implementations.
Figure 5:
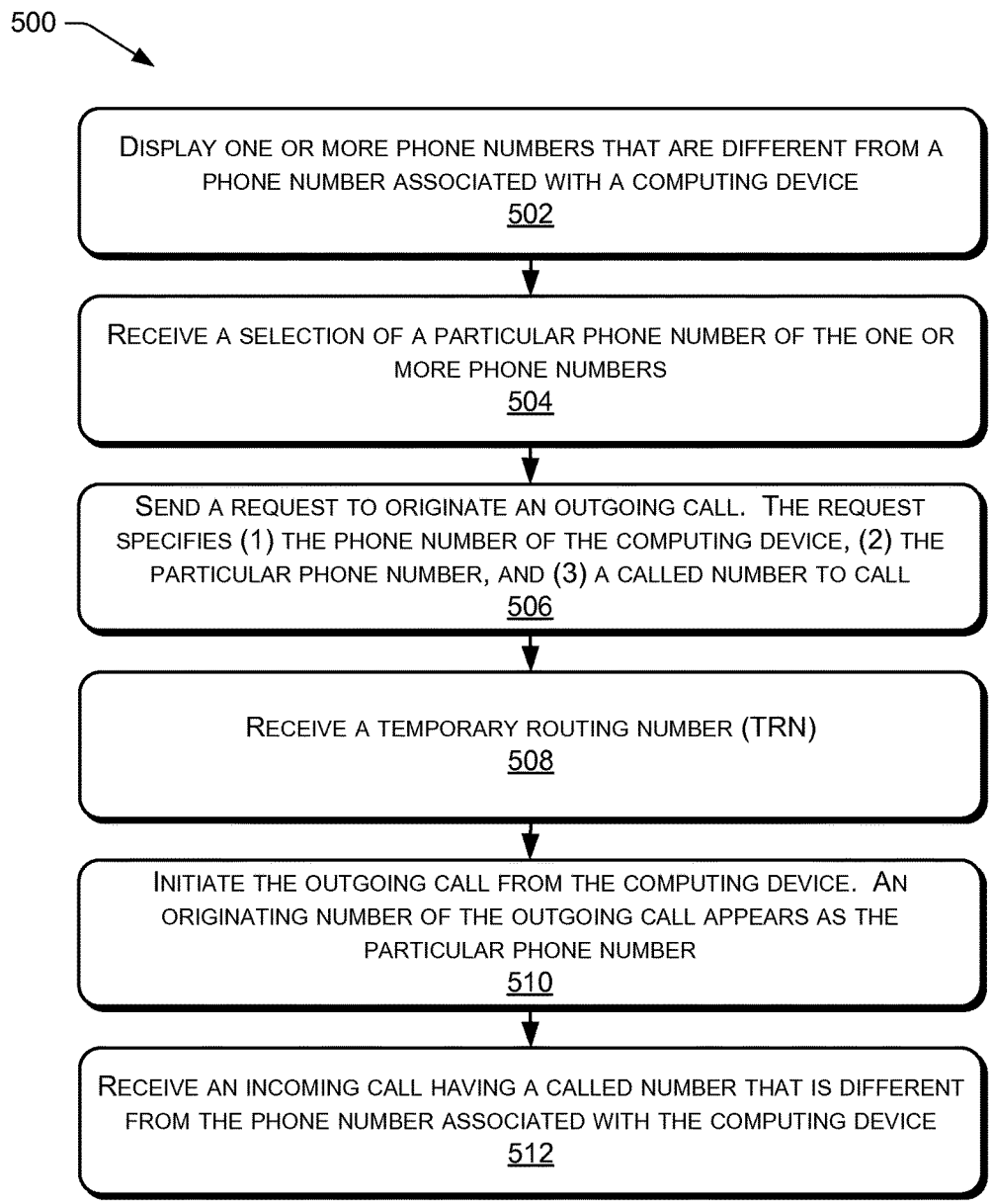
FIG. 5 is a flow diagram of an example process that includes receiving a temporary routing number according to some implementations.

In the flow diagrams of FIGS. 4 and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to the systems 100, 200, and 300, as described above, although other models, frameworks, systems and environments may implement these processes.

FIG. 4 is a flow diagram of an example process 400 that includes determining a location of a computing device according to some implementations. The process 400 may be performed by the computing device 102 of FIGS. 1, 2, and 3.

At 402, a location (e.g., a current location) of a computing device is determined. At 404, in some implementations, a Cell Global Identity (CGI) may be determined from a local cell site and the location determined based on an Mobile Country Code (MCC) included in the CGI. For example, in FIG. 3, the current location of the computing device 102 may be determined based on the MCC 318 included in the CGI 316 that is broadcast by the local cell site 314. At 406, in some implementations, GPS may be used to determine the current location of the computing device and the current location compared with polygons in a coverage map of the carrier associated with the computing device to determine whether the current location is in an area in which the carrier provides service. At 408, a determination is made as to whether the location is within a coverage area of a carrier associated with the computing device. For example, in FIG. 1, the location determination module 120 may determine a current location of the computing device 102 using GPS and then compare the current location with the coverage file 124 to determine whether the current location is in an area in which the carrier associated with the network 106 provides service. The coverage file 124 may include a map having polygons showing the coverage provided by the network 106 of the carrier.

If a determination is made, at 408, that the location is within the coverage area of the carrier, then the computing device may set the computing device to cellular mode and register with the network in cellular mode, e.g., requesting that calls be originated from and terminated to the computing device using cellular-based communications (e.g., GSM, CDMA, UMTS, or the like). For example, in FIG. 3, the computing device 102 may be set to operate in cellular mode and the computing device 102 may register with the first network 306 of the first carrier 304 in cellular mode.

If a determination is made, at 410, that the location is not within the coverage area of the carrier, then the computing device may set the computing device to OTT mode and register with the network in OTT mode, e.g., requesting that calls be originated from and terminated to the computing device using a data network via VoIP or other data-based communications technology. For example, in FIG. 3, the computing device 102 may be set to operate in OTT mode and the computing device 102 may register with the second network 306 of the second carrier 310 in OTT mode.

FIG. 5 is a flow diagram of an example process 500 that includes receiving a temporary routing number according to some implementations. The process 500 may be performed by the computing device 102 of FIGS. 1-3.

At 502, one or more phone numbers that are different from a phone number associated with a computing device may be displayed. At 504, a selection of a particular phone number of the one or more phone numbers may be received. At 506, a request may be sent to originate an outgoing call. The request may specify the phone number associated with the computing device, (2) the particular phone number (e.g., that was previously selected) to be associated with the call as the originating number, and (3) a called number that is to be called by the outgoing call. For example, in FIG. 1, when a user desires to originate the outgoing call 164 having the originating number 130 that is different from the device number 126, the computing device may display one or more of the additional numbers 132. After receiving a selection of one of the additional numbers 132 for use as the originating number 130, the computing device 102 may send the call request 162 (e.g., that includes the device number 126, the called number 128, and the originating number 130) to the server 104.

At 508, a temporary routing number may be received. At 510, the outgoing call is initiated from the computing device. The originating number of the outgoing call appears (e.g., to the called number) as the particular phone number. For example, in FIG. 1, in response to receiving the call request 162, the server 104 may send the TRN 166 to the computing device 102. In response to receiving the TRN 166, the computing device 102 may initiate the outgoing call 164. The server 102 may modify call data of the outgoing call 164 such that the outgoing call 164 appears to the called number 128 as if the outgoing call 164 originated from the originating number 130 (e.g., rather than the device number 126).

At 512, an incoming call having a called number that is different from the phone number associated with the computing device may be received. For example, in FIG. 2, the computing device 102 may receive and terminate (e.g., answer) the incoming call 202. The called number 204 of the incoming call 202 may be one of the additional numbers 132 that are different from the device number 126.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method performed by one or more processors configured with specific instructions, the method comprising:
   determining a location of a computing device having an associated first phone number;
   determining that the location of the computing device is outside an area in which a carrier associated with the first phone number provides service;
   sending a registration request to a local network indicating that the computing device is operating in an over the top mode;
   sending, to the local network, a request to initiate an outgoing call from the computing device, the request specifying that a second phone number that is different from the first phone number is to be identified as an originating number of the outgoing call;
   in response to the sending the request to initiate the outgoing call, receiving, from the local network, a temporary routing number that is a different number than the first phone number and the second phone number; and initiating the outgoing call using the temporary routing number, wherein the originating number of the call appears to be the second phone number.

2. The method of claim 1, wherein determining that the location of the computing device is outside the country in which the carrier associated with the first phone number provides service comprises:

determining a cell global identity of a local cell site of the local network;

determining a mobile country code based on the cell global identity; and determining that the mobile country code is different from a country code associated with the carrier of the first phone number.

3. The method of claim 1, wherein determining that the location of the computing device is outside the country in which the carrier associated with the first phone number provides service comprises:

determining the location of the computing device using a global positioning system (GPS);

determining a geographic area in which service is provided by the carrier associated with the first phone number; and determining that the location of the computing device is outside the country associated with the carrier associated with the first phone number.

4. The method of claim 3, wherein determining the geographic area in which service is provided by the carrier associated with the first phone number comprises:

retrieving a polygon coverage file associated with the carrier associated with the first phone number.

5. The method of claim 1, wherein initiating the outgoing call from the computing device comprises:

displaying a plurality of additional phone numbers that are each different from the first phone number, the plurality of additional phone numbers including the second phone number; and receiving a selection identifying the second phone number, wherein the request to initiate the outgoing call specifies that:

the computing device that is associated with the first number will initiate the outgoing call; and a called number is a destination of the outgoing call.

6. The method of claim 1, wherein the outgoing call comprises a voice over Internet Protocol (VoIP) call that is routed over a data network portion of the local network.

7. The method of claim 1, further comprising:

receiving, by the computing device, an incoming call having a called number that is different from the first phone number associated with the computing device.

8. One or more non-transitory computer readable media storing instructions that are executable by one or more processors to perform operations comprising:

determining, by a computing device having an associated first phone number, a location of the computing device;

determining that the location of the computing device is outside a geographic area in which a carrier associated with the first phone number provides service;

automatically setting the computing device to operate in an over the top mode;

sending a registration request to a local network indicating that the computing device is operating in the over the top mode;

sending, to the local network, a request to initiate an outgoing call from the computing device, the request specifying that a second phone number that is different from the first phone number is to be identified as an originating number of the outgoing call;

in response to the sending the request to initiate the outgoing call, receiving, from the local network, a temporary routing number that is a different number than the first phone number and the second phone number; and initiating the outgoing call using the temporary routing number, wherein the originating number of the call appears to be the second phone number.

9. The one or more computer readable media of claim 8, wherein, before originating the outgoing call from the computing device, the operations further comprise:

displaying one or more additional phone numbers that include the second phone number; and receiving a selection of the second phone number as the originating number of the outgoing call.

10. The one or more computer readable media of claim 8, wherein the request to initiate the outgoing call further specifies that:

the computing device having the associated first phone number will originate the outgoing call; and a called number is a destination of the outgoing call.

11. The one or more computer readable media of claim 8, wherein the outgoing call is initiated by a native dialer of the computing device.

12. The one or more computer readable media of claim 8, wherein the operations further comprise:

determining that the computing device has moved to the geographic area in which the carrier associated with the first phone number provides service; and automatically switching the computing device from the over the top mode to a cellular mode.

13. A computing device, comprising:

one or more processors; and one or more computer readable media to store instructions that are executable by the one or more processors to perform operations comprising:

determining that a location of the computing device is outside a geographic area in which a carrier that is associated with the computing device provides service;

automatically, based on the location of the computing device, setting the computing device to operate in an over the top mode;

sending a registration request to a local network indicating that the computing device is operating in the over the top mode;

sending, to the local network, a request to initiate an outgoing call from the computing device, the request specifying that a second phone number that is different from the first phone number is to be identified as an originating number of the outgoing call;

in response to the sending the request to initiate the outgoing call, receiving, from the local network, a temporary routing number that is a different number than the first phone number and the second phone number; and initiating the outgoing call using the temporary routing number, wherein the originating number of the call appears to be the second phone number.

14. The computing device of claim 13, the operations further comprising:

after the outgoing call has ended, receiving a notification of an incoming call having a called number comprising a third phone number that is different from the first phone number; and answering the incoming call using the computing device.

15. The computing device of claim 13, wherein the request to initiate the outgoing call specifies that:

the computing device associated with the first phone number is to originate the outgoing call; and a called number is to be a destination number of the outgoing call.

16. The computing device of claim 15, wherein the message is sent via a data transmission.

17. The computing device of claim 13, wherein determining that the location of the computing device is outside the geographic area in which the carrier that is associated with the computing device provides service comprises:

determining a mobile country code based on a cell global identity of a local cell site of the local network; and determining that the mobile country code is different from a country code associated with the carrier of the first phone number.

18. The computing device of claim 13, wherein determining that the location of the computing device is outside the geographic area in which the carrier that is associated with the computing device provides service comprises:

determining the location of the computing device using a global positioning system (GPS);

determining the geographic area in which the carrier that is associated with the computing device provides service; and determining that the location of the computing device is outside the geographic area in which the carrier that is associated with the computing device provides service comprises.

* * * * *